United States Patent
Matsumoto et al.

(10) Patent No.: US 6,373,264 B1
(45) Date of Patent: Apr. 16, 2002

(54) IMPEDANCE DETECTION APPARATUS AND METHOD OF PHYSICAL VARIABLE

(75) Inventors: Toshiyuki Matsumoto, Hyogo-ken; Yoshihiro Hirota, Kyoto; Muneo Harada, Hyogo-ken; Takaya Miyano, Aomori-ken, all of (JP)

(73) Assignee: Sumitomo Metal Industries, Ltd., Osaka (JP)

(*) Notice: Subject to any disclaimer, the term of this patent is extended or adjusted under 35 U.S.C. 154(b) by 0 days.

(21) Appl. No.: 09/402,724

(22) PCT Filed: Feb. 19, 1999

(86) PCT No.: PCT/JP99/00735
§ 371 Date: Oct. 8, 1999
§ 102(e) Date: Oct. 8, 1999

(87) PCT Pub. No.: WO99/42847
PCT Pub. Date: Aug. 26, 1999

(30) Foreign Application Priority Data

Feb. 19, 1998 (JP) .......................... 10-078244
Apr. 27, 1998 (JP) .......................... 10-116357
May 14, 1998 (JP) .......................... 10-131736

(51) Int. Cl.⁷ .............................. G01R 27/26
(52) U.S. Cl. .................. 324/667; 324/658; 324/666; 324/674; 324/680; 324/681
(58) Field of Search ................. 324/678, 667, 324/674, 681, 691, 710, 680, 658, 666, 76.69, 76.39, 76.48, 663; 73/335.02; 323/364, 369, 370; 331/65

(56) References Cited

U.S. PATENT DOCUMENTS

| | | | |
|---|---|---|---|
| 4,187,459 A | * 2/1980 | Wolfendale | 324/676 |
| 4,276,468 A | * 6/1981 | Nagamoto et al. | 377/2 |
| 5,515,723 A | 5/1996 | Tsuchida et al. | |
| 5,585,733 A | * 12/1996 | Paglione | 324/678 |
| 5,652,382 A | * 7/1997 | Nakagawa et al. | 73/335.02 |
| 5,808,516 A | * 9/1998 | Barber | 330/282 |

FOREIGN PATENT DOCUMENTS

| | | |
|---|---|---|
| EP | 0193421 A | 9/1986 |
| GB | 2002143 A | 2/1979 |
| GB | 1580335 A | 12/1980 |

OTHER PUBLICATIONS

Dai Ming Yuan: "Wein–Robinson–Oszillator Zur Messung Kleiner Kapazitatsanderungen" Elektronik, vol. 37, No. 9, Apr. 29, 1988 pp. 86–89, XP000112122.

* cited by examiner

Primary Examiner—Safet Metjahic
Assistant Examiner—Anjan Deb
(74) Attorney, Agent, or Firm—Barnes & Thornburg

(57) ABSTRACT

An apparatus for detecting an impedance variable in response to a sensed physical amount of a sensor is provided which comprises an impedance-frequency conversion unit and a counter. The impedance-frequency conversion unit converts the sensor impedance to an oscillation signal a frequency of which corresponds to the sensor impedance. The impedance-frequency conversion unit comprises an impedance-voltage converter for providing a voltage corresponding to the sensor impedance, and a Wien bridge oscillator including an element an impedance of which varies in response to the voltage from the impedance-voltage converter, for generating the oscillation signal. The Wien bridge oscillator is capable of generating a square wave signal as the oscillation signal. The counter counts the number of waves (or wave number) of the oscillation signal in a predetermined time period to output a count value which can be handled as a digital signal.

21 Claims, 11 Drawing Sheets

US 6,373,264 B1

IMPEDANCE DETECTION APPARATUS AND METHOD OF PHYSICAL VARIABLE

The present application is a National stage entry filed under 35 U.S.C. 371 of PCT Application Ser. No. PCT/JP99/00735 filed Feb. 19, 1999.

TECHNICAL FIELD

The present invention generally relates to a detection apparatus and method for detecting an amount of a physical variable, and more particularly to a detection apparatus and method for detecting an amount of a physical variable to provide a signal corresponding to an amount which can be digitally processed.

BACKGROUND ART

As a prior art example of a detection circuit adapted to detect a change in a physical amount, it is described in Japanese Patent Public Disclosure (Laid-Open or Kokai) No. 63-108257 issued in 1988, for example. FIG. 1 is a block diagram illustrating the prior art detection circuit described in the No. 63-108257. The detection circuit, which is intended to detect humidity as a physical amount, comprises an oscillation unit 51 having a humidity sensor 54, a F-V converter 52, and a logarithmic amplifier 53. The humidity sensor 54 is designed to vary its resistance in accordance with variations in ambient humidity. Then, the resistance variation causes the oscillation unit 51 to change its oscillation frequency. An output signal of the oscillation unit 51 is next input to the F-V converter 52, where the frequency of the signal is converted to a direct current voltage. The direct current voltage signal output from the F-V converter circuit 52 is next inputted to the logarithmic amplifier 53, where the direct current voltage is logarithmically amplified. In this way, this detection circuit can reveal the ambient humidity on the bases of the output voltage value from the logarithmic amplifier 53.

Another prior detection circuit is described in Japanese Patent Publication (Kokoku) No. 2-22338. This detection circuit also detects a change in humidity as is the case of the above-mentioned No. 63-108257. Although not shown here, the detection circuit comprises an integrator for detection including a humidity sensor as a capacitance which changes its value in response to humidity, and a reference integrator for comparison which does not change the time constant. In an operation of the detection circuit, the same pulse signal is input to both the integrators, and the difference between signals output from the respective integrators is delivered from a differential amplifier, and a maximum value of the difference is further output from a peak hold circuit as a direct current voltage signal. Thus, the detection circuit can provide the ambient humidity based on the output voltage of the peak hold circuit.

Another prior art example of a detection circuit is described in Japanese Patent Public Disclosure (Kokai) No. 63-27720. FIG. 2 is a circuit diagram illustrating the detection circuit which is for weight detection described in No. 63-27720.

SUMMARY OF THE INVENTION

In recent years, integrated circuit technologies have advanced and digital signal processing requiring complicated product/sum operations can be readily performed by using a processor dedicated to signal processing or the like. Since such digital signal processing enables time division processing or the like using a software control, a large amount of complicated signals can be processed to precisely reveal a variety of information while avoiding a system from requiring a larger size and an increased cost.

Each of the detection circuits described in the above-mentioned Japanese Patent Public Disclosure Nos. 63-108257 and 2-22338, however, outputs, from its output terminal, an analog signal or voltage which has magnitude depending on the physical amount. It is therefore necessary to convert the output voltage into a digital signal by an additional A/D converter in order to digitally process it. For this reason, if the digital processing apparatus such as a microcomputer is introduced to process the output of the detection circuit, a more complicated configuration such as an A/D converter is required therebetween, thus causing a problem of an increased size and an increased cost of the entire system. Particularly, when parallel real time processing is required for a large number of signals output from such detection circuits, it is necessary to parallelly provide a number of A/D converters equal to the number of signals from the detection circuits, making the above problem more prominent.

On the other hand, as illustrated in FIG. 2, the detection circuit described in Japanese Patent Public Disclosure No. 63-27720 comprises an oscillation unit 42 including operational amplifiers 42a, 42b and a sensor 41 which changes the capacitance in accordance with a weight applied thereto. An oscillation frequency of the oscillation unit 42 changes in response to a change in the capacitance of the sensor 41. A variable resistor 43 is also provided in the oscillation unit 42 for adjusting a basis of the oscillation frequency.

An output signal of the oscillation circuit 42 is input to an amplifier 46 including a transistor 46a. The amplifier 46 amplifies the output signal of the oscillation unit 42 so as to have an enough amplitude that a counter 47 in a microcomputer 45 can count the number of waves of the oscillation signal. Thus, the counter 47 counts the number of the waves in the amplified signal during a predetermined time period, and outputs a count value to a processing unit 48 in the microcomputer 45. A voltage setting circuit 44 in turn sets a predetermined direct current voltage. This direct current voltage is input to an A/D converter 49 in the microcomputer 45 where it is converted into a digital signal, and then output to the processing unit 48. The processing unit 48 calculates the capacitance of the sensor 41 from the count value, using the digital value input from the A/D converter 49 as a conversion coefficient.

In the detection circuit shown in FIG. 2, the oscillation unit 42 converts a change in the capacitance of the sensor 41 into a change in frequency. Then, the counter 47 counts the number of the waves in the frequency signal from the oscillation unit 42 so that the capacitance change of the sensor 41 can be revealed as a digital signal.

However, in the detection circuit shown in FIG. 2, any parasitic capacitance is inevitably formed at an input terminal of the operational amplifier 42a or the like. Therefore, when a sensor 41 having an extremely small capacitance must be used, a change in the capacitance of the sensor 41 does not induce an apparent change in frequency of the output signal due to the influence of the parasitic capacitance. Particularly, in the approach which counts the number of waves in the signal output from the oscillation unit 42 in a predetermined period to reveal a change in the capacitance of the sensor 41, only a change in frequency exceeding a certain level eventually represents a change in the number of the waves. Therefore, it causes a problem in that a change in the capacitance of the sensor 41 is difficult to be captured when a change in the oscillating frequency does not reach the level. It is contemplated to make the oscillating frequency of the oscillation unit 42 higher and use a very high speed counter 47 in order to solve such a problem as above. However, the solution would result in a more complicated circuit configuration and therefore a very expensive apparatus. Furthermore, the parasitic capacitance as mentioned becomes significantly larger when the operational amplifier 42a of the oscillation unit 42 and the sensor 41 are formed on separate chips. Consequently, such an increased parasitic capacitance would make it difficult to produce stable oscillation in the oscillation unit 42.

Further, in the detection circuit shown in FIG. 2, a change in the counted number of the waves must be converted into a change in a capacitance through digital processing in the processing unit 48. However, the oscillation frequency of the oscillation unit 42 as mentioned above hardly exhibits a simple proportional relationship with the capacitance value of the sensor 41. In other words, complicated operations such as square and inversion operations must be performed at high speed in the processing unit 48 in order to reveal a change in the capacitance of the sensor 41 in real time. Therefore, unless a particularly expensive and high performance microcomputer is employed, most of the capabilities of the processing unit 48 would be used up by such operations.

The present invention has been made to solve the problems inherent to the prior arts. Accordingly, an object of the present invention is to provide detection apparatus and a method using an oscillation unit, an output frequency of which varies reliably depending on an impedance such as a capacitance of a sensor.

Another object of the present invention is to provide detection apparatus and method using an oscillation unit an output frequency of which varies substantially proportional to an impedance such as capacitance of a sensor.

Further object of the present invention is to provide detection apparatus and method which are capable of constantly capturing a change in a capacitance of a sensor without fail in a simple configuration, irrespective of values of the sensor capacitance and parasitic capacitances.

A still further object of the present invention is to provide a detection apparatus and method using an oscillation unit an output frequency of which varies depending on a capacitance of a sensor in which the oscillation unit can provide a square wave in order that a variation in amplitude of the oscillation output does not affect the detection of the capacitance value.

In order to achieve the purposes of the present invention, an apparatus for detecting a sensor impedance which varies in response to a sensed physical amount of at least one sensor, according to the present invention, comprises an impedance-frequency conversion unit for converting the sensor impedance to an oscillation signal a frequency of which corresponds to the sensor impedance and a counter for counting the number of the waves of the oscillation signal in a predetermined time period to output a count value, wherein the impedance-frequency conversion unit comprises an oscillator including the sensor impedance, for generating a square wave signal as the oscillation signal.

In the apparatus mentioned above, the oscillator is preferably a Wien bridge oscillator including an amplifier having a variable gain and a positive feedback circuit of the amplifier, wherein the positive feedback circuit includes a resistor or capacitor as the sensor impedance, and a product of a gain of the amplifier and a positive feedback ratio of the feedback circuit is chosen to be more than or equal to one. Further, it is preferable that the sensor impedance has one end connected to a reference voltage.

The apparatus mentioned above can further comprise additional sensors and counters, wherein the impedance-frequency conversion unit further comprises additional oscillators including the additional sensor impedances respectively, for generating square wave signals as additional oscillation signals to the respective additional counters, frequencies of the additional oscillation signals respectively corresponding to the additional sensor impedances. In the apparatus, the sensors are preferably constituted as a resonator array.

In another aspect of the present invention, there is provided an apparatus for detecting a sensor impedance which varies depending on a sensed physical amount of at least one sensor, the apparatus comprising an impedance-frequency conversion unit for converting the sensor impedance to an oscillation signal a frequency of which corresponds to the sensor impedance and a counter for counting the number of waves of the oscillation signal in a predetermined time period to output a count value, wherein the impedance-frequency conversion unit comprises an impedance-voltage converter for providing an output voltage corresponding to the sensor impedance and an oscillator including a variable impedance element, an impedance of which varies depending on the output voltage of the impedance-voltage converter, for generating the oscillation signal. In addition, a frequency of the oscillation signal depends on a varied impedance of the element.

The apparatus of the second aspect preferably includes a voltage adding unit positioned between the impedance-voltage conversion unit and the oscillator, for adding a predetermined DC voltage to the output voltage of the impedance-voltage converter. The added voltage is provided to the variable impedance element of the oscillator.

In the apparatus of the second aspect, it is preferable that the variable impedance element of the oscillator is formed by a drain-source resistance of a first MOS FET which is variable by a voltage applied to a gate thereof, and the voltage adding unit comprises a second MOS FET having a gate which connected to receive the output voltage corresponding to the sensor impedance and a drain connected to a variable load resistor to provide an added voltage to the gate of the first MOS FET.

In the apparatus of the second aspect, it is preferable for the sensor impedance to be a capacitor and the impedance-voltage converter comprises (a) a first operational amplifier having an inverting input terminal connected to receive an input voltage through a resistor from a variable voltage generator and connected to its output terminal through a resistor and a first switch connected in parallel to each other, and a non-inverting input connected to receive the input voltage through the sensor impedance and a reference voltage through a switch, wherein the input voltage is variable during the switch is turned off, (b) a second operational amplifier having an inverting input connected to receive the input voltage through a resistor from the variable voltage generator and connected to its output through a resistor and a second switch connected in parallel to each other, and a non-inverting input connected to a reference voltage terminal, and (c) a third operational amplifier having a non-inverting input connected to receive an output voltage from the first operational amplifier, and an inverting input connected to receive an output voltage from the second operational amplifier and connected to an output through a variable resistor and a third switch connected in parallel to each other, wherein the output is connected to the gate of the second MOS FET, and the first through third switches are turned on to reset the impedance-voltage conversion unit and turned off before starting a measurement of the impedance. The first through third switches are turned on during a reset or initialization cycle and turned off before starting a measurement cycle.

A method of detecting a sensor capacitance which varies in response to a sensed physical amount of a sensor, according to the present invention comprises the steps of (a) converting the sensor capacitance to a voltage corresponding thereto, (b) varying an impedance of an element in response to the converted voltage, (c) generating a frequency signal from an oscillator, which varies in response to the impedance of the element, (d) counting the number of waves of the frequency signal from the oscillator in a predetermined time period, whereby the sensor capacitance is converted to the oscillation frequency signal which is a digital form.

BEST MODE FOR CARRYING OUT THE INVENTION

Figure 1:
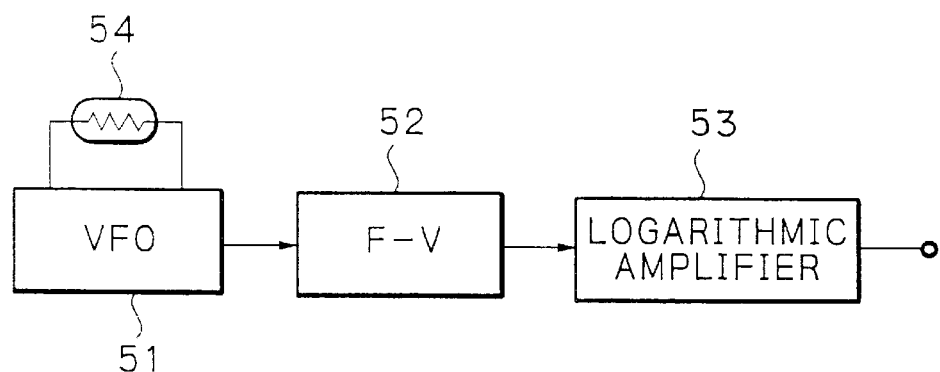
FIG. 1 is a block diagram illustrating a prior detection apparatus for detecting a sensor capacitance.
Figure 2:
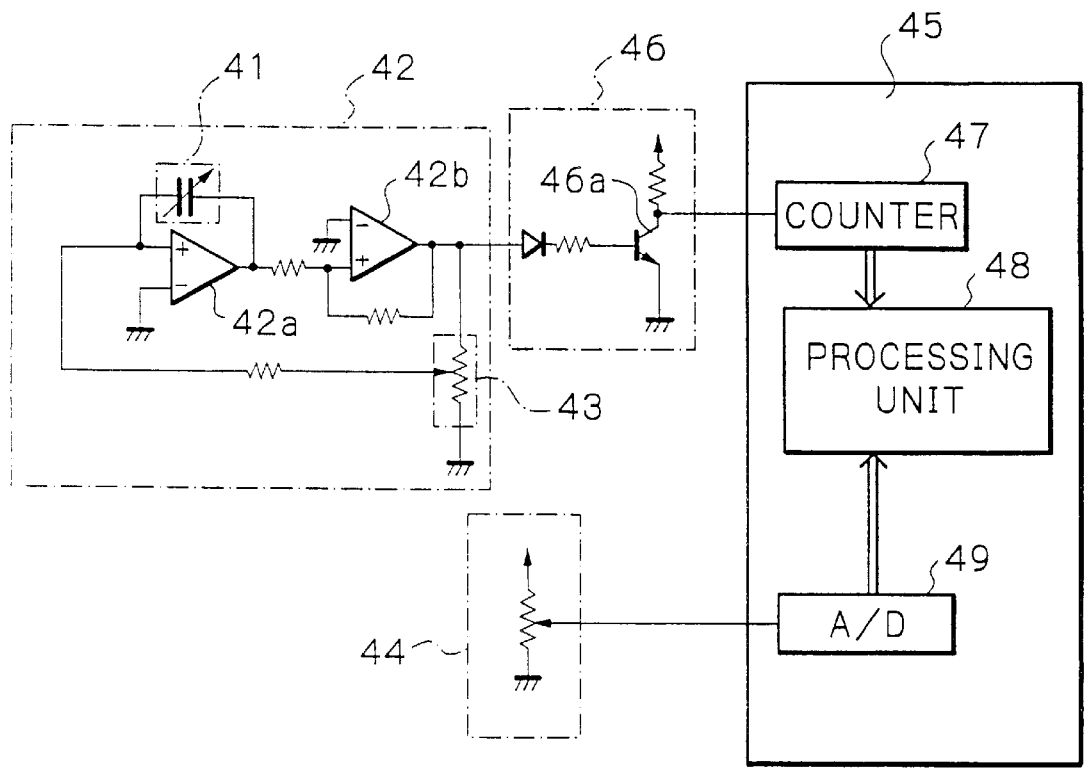
FIG. 2 is a block diagram illustrating another prior detection apparatus for detecting a sensor capacitance.
Figure 3:
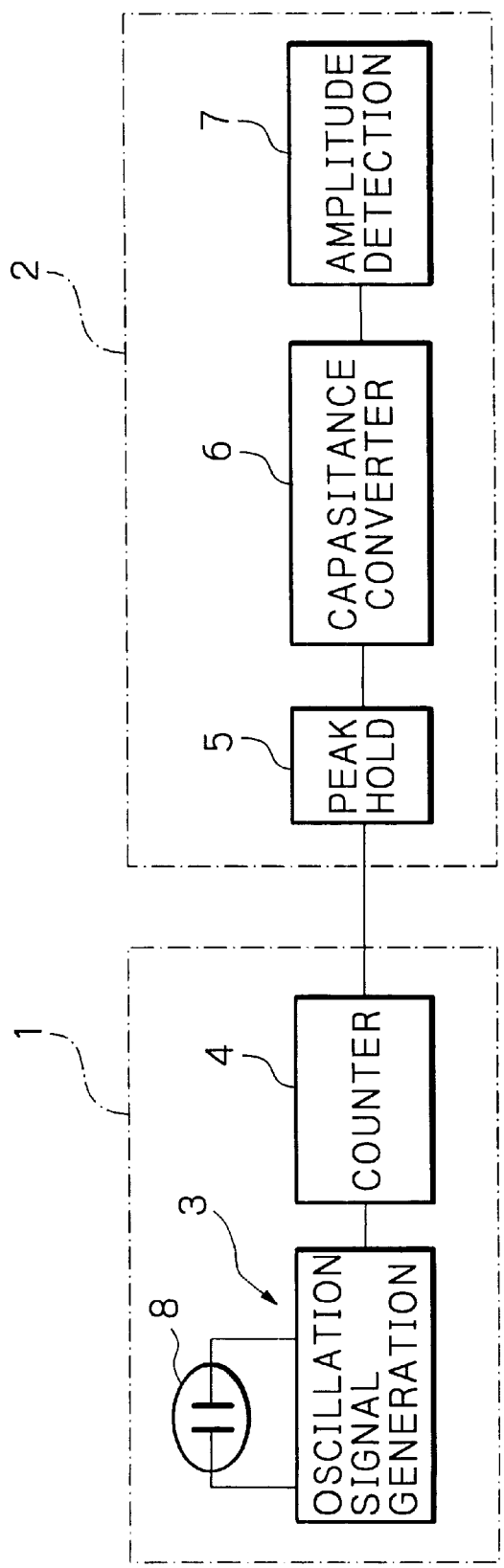
FIG. 3 shows a block diagram schematically illustrating a detection apparatus for detecting a sensor capacitance according to the present invention.

FIG. 3 is a block diagram generally illustrating a detection system according to the present invention which comprises a detection apparatus 1 and a digital signal processing apparatus 2. The detection apparatus 1 is composed of an oscillation signal generation unit 3 having a sensor 8 and a counter 4, and provides a digital signal corresponding a physical amount sensed by the sensor 8 which can be directly processed by the digital signal processing apparatus 2. The digital signal processing apparatus 2 is composed of a peak hold unit 5, a capacitance converter unit 6, and an amplitude detection unit 7, and recognizes the physical amount sensed by the sensor 8 based on the signal provided by the counter 4. The capacitance converter unit 6 is a device which calculates a capacitance value from peak voltages provided from the peak hold unit 5. The amplitude detection unit 7 is a device which calculates an amplitude of a resonation signal from the capacitance value of the capacitance converter unit 6.

Figure 4:
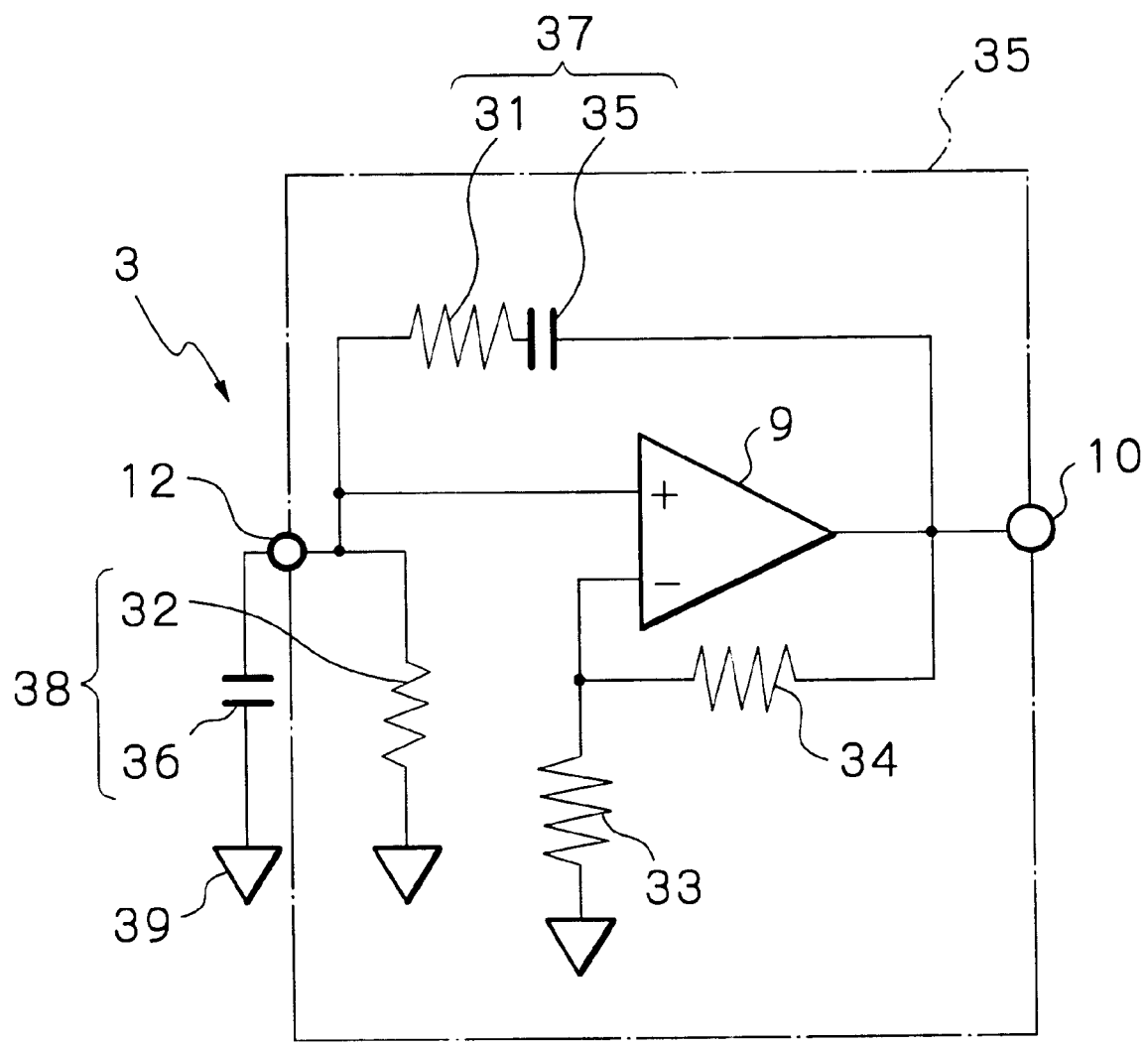
FIG. 4 illustrates a detailed constitution of a Wien bridge oscillator which is usable as an oscillation signal generation unit of the apparatus shown in FIG. 3.

FIG. 4 illustrates a circuit diagram of a first embodiment of the oscillation signal generation unit 3 incorporated in the detection apparatus 1 shown in FIG. 3. The unit 3 is implemented as an Wien bridge oscillator, which applies a positive feedback to an amplifier by a feedback circuit network having frequency selectivity. More specifically, the feedback circuit network is formed of a first impedance portion 37 including a serial circuit of a resistor 31 and a capacitor 35, and a second impedance portion 38 formed of a parallel circuit of a resistor 32 and a capacitor 36. The feedback circuit network applies a positive feedback to a non-inverting input terminal or node of an operational amplifier 9, while an inverting input terminal or node of the operational amplifier 9 is applied with a negative feedback by third and fourth resistors 33 and 34. The second impedance portion 38 has one end connected to a ground terminal 39, and the capacitor 36 thereof is constituted by the sensor 8 illustrated in FIG. 3.

In the Wien bridge oscillator 3 with sensor capacitor 36 shown in FIG. 4, a gain of the amplifier, i.e., a closed loop gain A with the negative feedback can be expressed by the following equation:

$$A = 1 + R4/R3 \tag{1}$$

In the equation (1), R3 and R4 are resistances of the resistors 33 and 34, respectively. A gain G of the entire oscillator including the sensor capacitance is expressed by the following equation as a product of the closed loop gain A and a positive feedback ratio by the feedback circuit network:

$$G = (1 + R4/R3)/(1 + R1/R2 + C2/C1) \tag{2}$$

In the equation (2), R1 and R2 are resistances of the resistors 31 and 32, respectively, and C1 and C2 are capacitances of the capacitors 35 and 36, respectively. When the gain G is substantially "1", the oscillation frequency f of the oscillator 3 can be expressed by the following equation:

$$f = 1/(2\pi) * (C1 * C2 * R1 * R2)^{-1/2} \tag{3}$$

Respective constants of elements of an oscillator are generally set such that a gain G is always larger than one. However, it has been revealed from experiments that as the gain G is increased more beyond one, the oscillation frequency f of the Wien bridge oscillator 3 shown in FIG. 4 gradually deviates from the theoretical value represented by the equation (3). While detailed analysis thereof is anticipated, it is considered that the phenomenon is in part contributed by the non-linearity of the operational amplifier 9 and so on.

Figure 5:
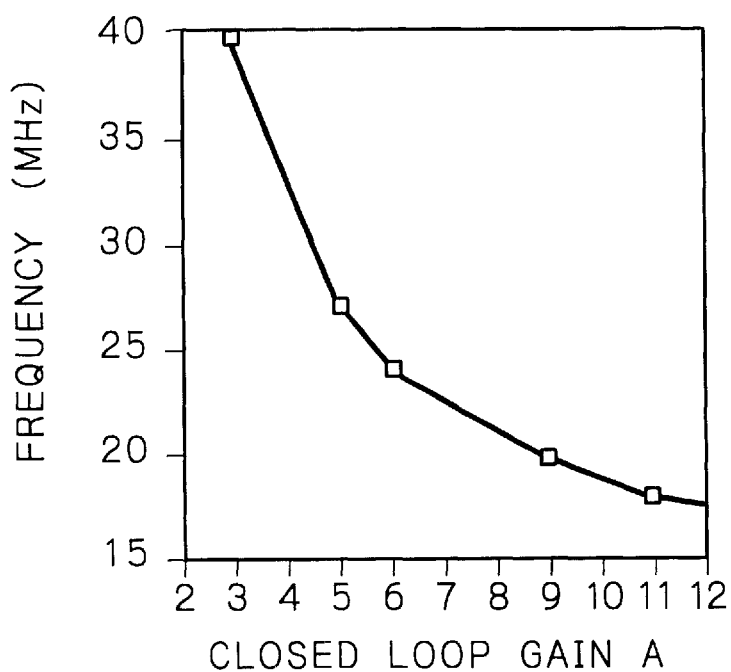
FIG. 5 is a graph illustrating a relationship between a closed loop gain A and an oscillation frequency in a simulated example of the Wien bridge oscillator shown in FIG. 4.

FIG. 5 is a graph showing a relationship between an oscillation frequency f and a closed loop gain A that is proportional to a gain G in a simulated example of the oscillator 3 shown in FIG. 4, where it was assumed that R1=R2=R3=50 kΩ, C1=100 fF, C2=50 fF, and R4 was variable. When the gain G was equal to one, i.e., when the closed loop gain A was equal to 2.5, the oscillation frequency f was approximately 45 MHz in the simulated example. The obtained frequency of 45 MHz is substantially equal to that calculated from the equation (3). However, as the closed loop gain A was gradually increased from 2.5, the obtained oscillation frequency f gradually became lower, as illustrated in FIG. 5.

Figure 6:
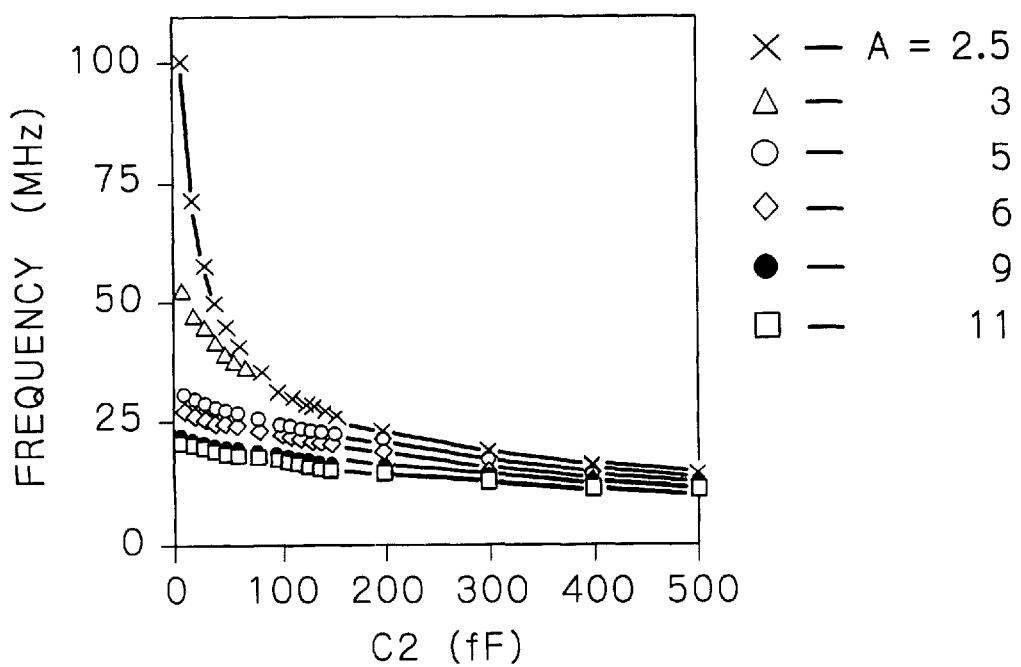
FIG. 6 is graphs depending on various closed loop gains, each illustrating a relationship between a sensor capacitance and an oscillation frequency of a simulated Wien bridge oscillator as shown in FIG. 4.

FIG. 6 is a graph illustrating a relationship between a capacitance C2 of a capacitor 36 and an oscillation frequency f for various closed loop gains A in a simulated example of the oscillator 3 shown in FIG. 4, where it was set that R1=R2=R3=50 kΩ and C1=100 fF. As illustrated in FIG. 6, as long as C2 was approximately 200 fF or more, the oscillation frequency f was not largely vary due to the variation in the closed loop gain A. On the other hand, when C2 was less than approximately 200 fF, the ratio of a change in the frequency f to a change in C2 largely varied depending on different values of the closed loop gain A. For example, with C2=300 fF, while the frequency f was 18.4 MHz when A was 2.5, the frequency f was 11.83 MHz when A was 11, presenting no remarkable difference between the two cases. However, as C2 was in a range from 200 fF to 10 fF, the frequency f was largely changed from 22.5 MHz to 100 MHz when A=2.5, while the frequency f was merely changed from 13.98 MHz to 19.86 MHz when A=11. It is therefore possible to adjust the sensitivity, i.e., the ratio of a change in the oscillation frequency f to a change in the capacitance C2, by changing the closed loop gain A. The closed loop gain A can be varied using a variable resistor for the resistor 33 or 34, or by replacing these resistors with other ones.

Figure 7:
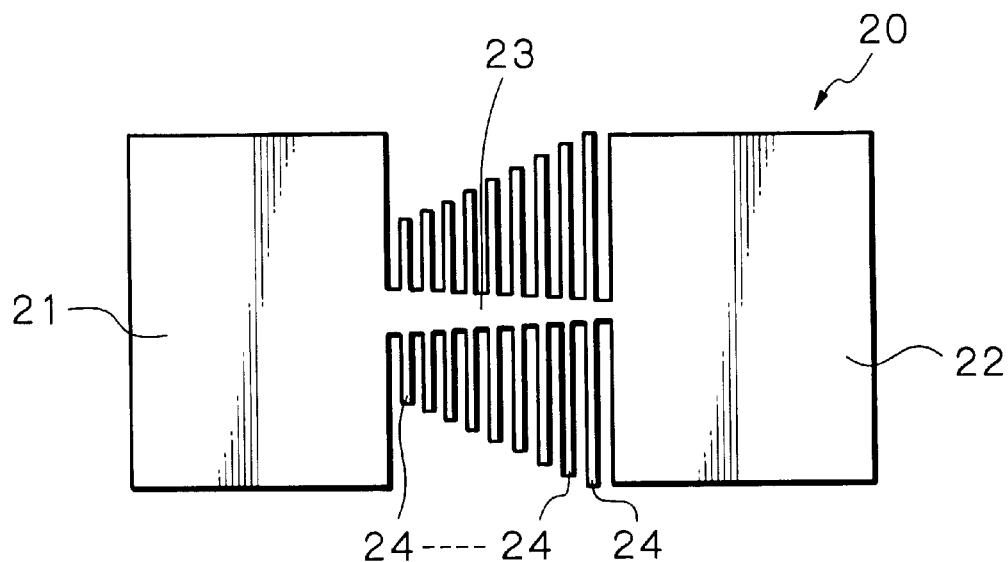
FIG. 7 is a plan view of a resonator array constituting sensors.

The sensor 8 shown in FIG. 3 (or the capacitor 36 shown in FIG. 4) may be constituted as a resonator array. FIG. 7 is a plan view of a resonator array 20 usable in the detection system according to the present invention, which has previously proposed by the present inventors and others. The array 20 comprises a first diaphragm 21 and a second diaphragm 22 coupled by a single transversal beam 23, and a plurality of lateral beams 24 which have different lengths from each other, and are parallelly arranged at predetermined interval and substantially orthogonal to the transversal beam 23.

Figure 8:
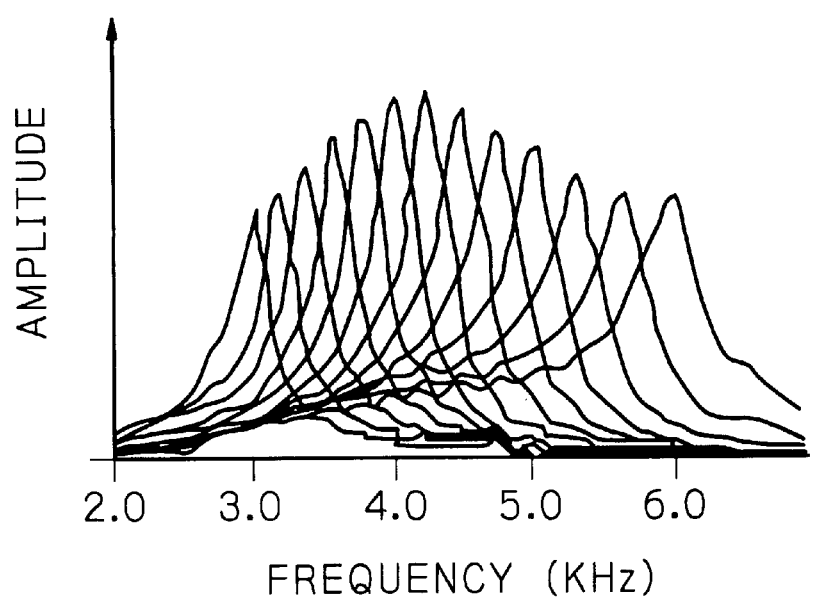
FIG. 8 is a graph illustrating relationships between oscillation frequencies and amplitudes of a simulated resonator array as shown in FIG. 7.

The resonator array 20 is configured to artificially replicate a human's auditory system, and generally acts as follows. When the first diaphragm 21 is provided with a vibrating signal in the audible frequency band, the vibrating signal is transmitted from the first diaphragm 21 to the second diaphragm 22 through the transversal beam 23. In course of the transmission, the respective lateral beams 24 start vibrating at their respective resonant frequencies. In other words, the lateral beams 24 absorb frequency components substantially coincident with their respective resonance frequencies from the transmitted vibrating signal to vibrate, whereby the input vibrating signal is divided into respective frequency components. FIG. 8 is a graph illustrating the vibrating amplitudes at the lateral beams 24 as a function of a frequency f. As is also apparent from the graph, when vibrating amplitudes of some of the lateral beams 24 are detected, particular frequency components can be extracted and revealed from the vibrating signal input to the first diaphragm 21.

Figure 9:
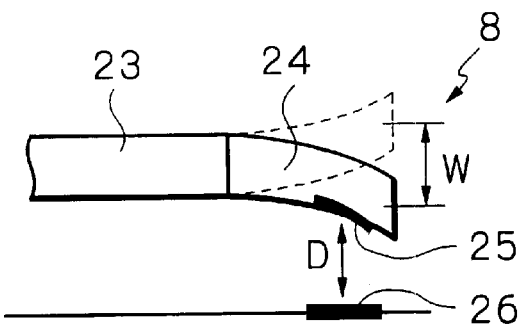
FIG. 9 is a schematic cross-sectional view of a part of the resonator array shown in FIG. 7.

FIG. 9 is a schematic cross-sectional view of a sensor 8 designed to detect a mechanical vibration amplitude W of a lateral beam 24. As illustrated in FIG. 9, the sensor 8 includes a beam electrode 25 disposed on the bottom surface of the lateral beam 24, and a stationary electrode 26 which faces the beam electrode 25. With this configuration, a capacitor is formed between these beam and stationary electrodes 25 and 26. As a distance D between the two electrodes 25, 26 changes in response to the vibrating of lateral beam 24, the capacitance of the capacitor also changes in reciprocal proportion to the distance D. This means that a sensor 8 is configured, which changes its capacitance according to a sensed mechanical vibration. Therefore, the sensor 8 shown in FIG. 9 can be used as the capacitor 36 in the oscillator 3 illustrated in FIG. 4.

Figure 10:
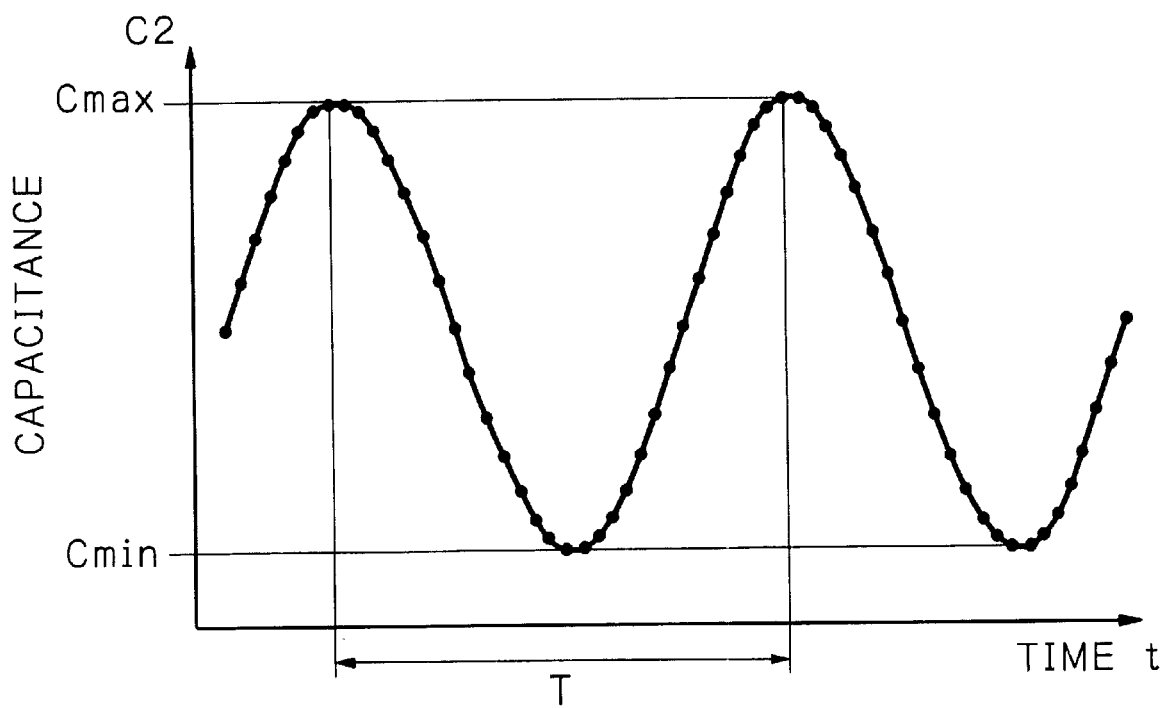
FIG. 10 is a graph illustrating a change in a sensor capacitance of the resonator array.

FIG. 10 is a graph illustrating a change in a capacitance C2 of the capacitor 36 formed by the sensor 8 shown in FIG. 9, as a function of time. As illustrated in FIG. 10, the capacitance C2 of the capacitor 36 varies between a maximum capacitance Cmax and a minimum capacitance Cmin in a cycle which is conformity to the mechanical vibration cycle T of the lateral beam 24. As the capacitor 36 exhibits the capacitance C2 varying as illustrated in FIG. 10, the oscillation frequency f varies in response to the closed loop gain A, as sown in FIG. 6. More specifically, the oscillation frequency f takes a minimum frequency fmin corresponding to the maximum capacitance Cmax, and a maximum frequency fmax corresponding to the minimum capacitance Cmin.

As mentioned above, elements of the oscillator 3 in FIG. 4 is set such that the gain G is always larger than one. Therefore, the output oscillation amplitude of the oscillator 3 monotonously increases from the time of power-on, and consequently, a pulsed oscillation waveform signal, an amplitude of which is saturated at a supply voltage, is output from an output terminal 10 of the oscillation unit 3 (see FIG. 4). The counter 4 shown in FIG. 3 receives the pulsed waveform signal and counts the number of pulses or waves (or wave number) included in the signal in a predetermined time period. The counter 4 can be implemented by a simple circuit such as a normal binary counter with a clear function, or the like. More specifically, the counter 4 receives the pulsed waveform signal as an input clock signal and a clear signal having a predetermined cycle to reset the counter 4, and counts the clocks for the predetermined cycle. In this event, if the counter output is, for example, an 8-bit binary signal, the counter can count up to 255 clock signals. Therefore, the oscillation frequency f can be converted to the count value from the counter 4 which is represented by a binary digital signal, and thus the count value can be directly input to the digital signal processing apparatus 2 shown in FIG. 3. As previously described with reference to FIG. 3, the digital signal processing apparatus 2 comprises the peak hold unit 5, the capacitance converter 6, and the amplitude detection unit 7. While the digital signal processing apparatus 2 may be implemented by a dedicated processor, a microcomputer may be used in an alternative for additionally performing other controls and so on.

The count value input from the counter 4 has a minimum count value CNTmin corresponding to the minimum frequency fmin and hence the maximum capacitance Cmax in FIG. 10, and a maximum count value CNTmax corresponding to the maximum frequency fmax and hence the minimum capacitance Cmin in FIG. 10. Thus, the peak hold unit 5 detects the minimum count value CNTmin and the maximum count value CNTmax, and holds them in registers of the unit 5.

The capacitance converter unit 6 converts the maximum count value CNTmax into the minimum capacitance Cmin, and the minimum count value CNTmin into the maximum capacitance Cmax. For performing these conversions, the correlation between the capacitance C2 and the oscillating frequency f as illustrated in FIG. 6, i.e., the correlation between the capacitance C2 and the count value of the counter 4 has to be previously stored in a memory provided in the digital signal processing apparatus 2 in correspondence to the closed loop gain A of the oscillator 3 shown in FIG. 4. Then, the capacitance C2 can be retrieved from the memory using the count values CNTmax and CNTmin as addresses, whereby the conversion can be achieved.

The capacitances Cmax and Cmin thus derived are respectively based on the distance D between the two electrodes 25 and 26 illustrated in FIG. 9. In the next step, the amplitude detection unit 7 converts the maximum capacitance Cmax into the minimum distance Dmin, and the minimum capacitance Cmin into the maximum distance Dmax. While these conversions may likewise be performed using the memory provided in the digital signal processing apparatus 2 in a manner similar to the above, the minimum and maximum distances may be calculated from an equation which expresses the relationship between the distance between the electrodes of the capacitor and its capacitance. By calculating the difference between the maximum distance Dmax and the minimum distance Dmin, the amplitude W of the lateral beams 24 can be revealed, thereby making it possible to detect the amplitude of a signal having a particular frequency component within the vibrating signal applied to the diaphragm 21 of the resonator array 20.

Figure 11:
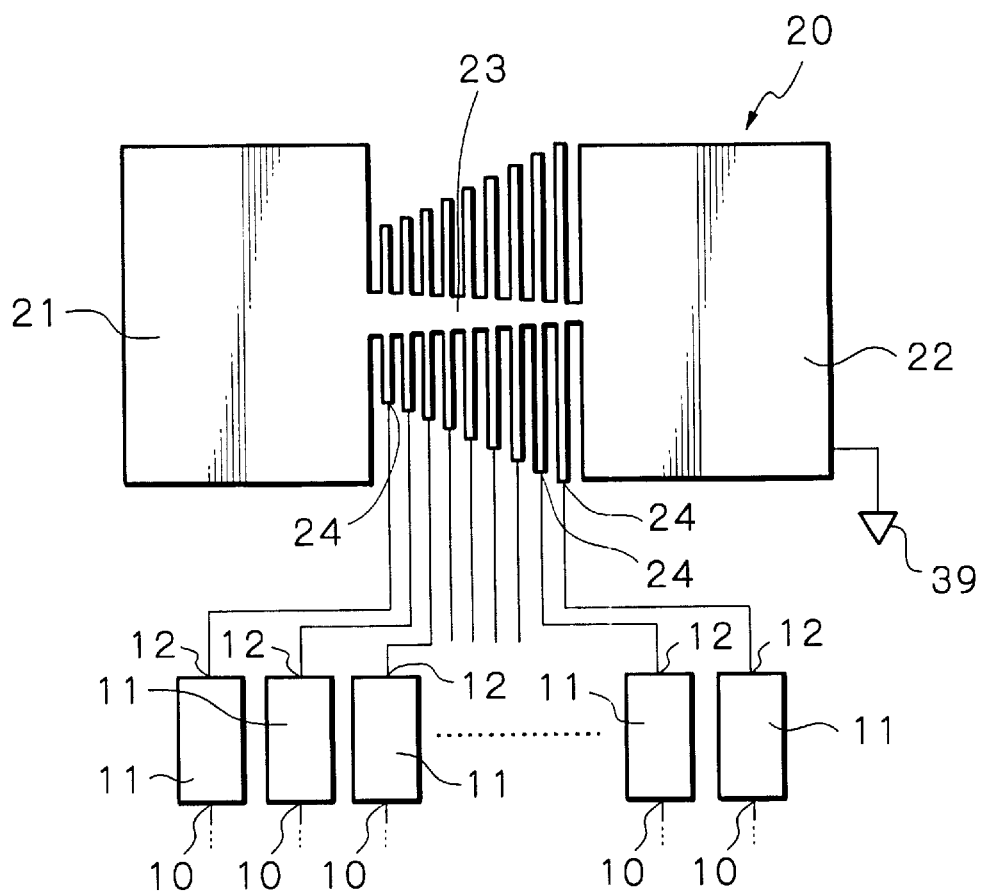
FIG. 11 is a block diagram of a sensor capacitance detection apparatus using the resonator array shown in FIG. 7 and the oscillators shown in FIG. 4.

As explained above, the resonator array 20 divides an input vibration signal into frequency components and parallelly outputs the frequency components as mechanical vibrations having amplitudes W at the lateral beams 24. Therefore, for in-real-time detecting respective frequency components included in the input vibrating signal, the amplitudes W of the lateral beams 24 must be parallelly calculated by an approach as mentioned above. FIG. 11 is a partial block diagram illustrating an apparatus which has been designed to detect the amplitudes W. Each of circuits 11 in FIG. 11 is the same as a circuit block 35 shown in FIG. 4, and thus the same as the oscillation unit circuit 3 excluding the capacitor 36. The resonator array 20 is made of electrically conductive members, part of which is connected to the ground terminal 39. Input terminals 12 of the circuits 11 arranged in parallel with each other are connected to the stationary electrodes 26 those face the electrodes 25 at the leading ends of the lateral beams 24. With this configuration, pulsed signals are output parallelly from output terminals 10 of the circuits 11 in a manner similar to that explained with reference to FIG. 4, so that these signals are input to the counter 4. In this way, the respective amplitudes can be derived in parallel for the frequency components.

In the detection apparatus 1 using the oscillator 3 shown in FIG. 4 and the counter 4, the sensor capacitance C2 of the capacitor 36 is output as the counter value represented by a binary digital value. Since the count value can be handled as they are at the digital signal processing apparatus 2, any A/D converter, which has been required, can be omitted. In particular, when the resonator array 20 shown in FIG. 11 are employed, since the amplitudes W of the lateral beams 24 are output as digital count values, a plurality of A/D converters can be omitted, thereby making the configuration more simple.

In the detection apparatus 1 using the oscillator 3 shown in FIG. 4 and the counter 4, the gain G of the oscillator 3 is set larger than one so that a pulsed signal is output from the output terminal 10 thereof. The counter 4 counts the number of the waves, by determining time points at which the waves exceed a predetermined threshold voltage. Therefore, with a pulsed output signal from the oscillation unit 3, the determination time points can be prevented from shifting in the time axis direction due to an amplitude change of the output from the oscillation unit 3. When the oscillator 3 generating pulsed output signals are employed as the circuits 11, it is possible to accurately reveal the amplitude values W of the lateral beams 24 because of the prevention of the determination time point shift. Moreover, the output signal of the oscillator 3 is always a pulsed signal which is saturated by a power supply voltage. Thus, even if disturbance, aging changes, variations in parts, or the like are present, the amplitude of the output signal will exceed the threshold voltage without fail. Thus, the occurrence of erroneous counting in the counter 4 is prevented.

While the oscillation frequency f of the Wien bridge oscillator 3 changes in response to a change in the capacitance C2, the tolerance for variations of the frequency f is limited by an operating speed of the counter 4. This is because, when the frequency f is excessively high, it is difficult for the counter 4 to count every pulse without omission. On the other hand, since a changing amount of the capacitance C2 is dictated by the characteristics of the sensor 8, it is generally difficult to control the capacitance C2 for adjusting a varying range of the oscillation frequency f. However, in the detector apparatus 1, a varying range of the oscillation frequency f can be adjusted in accordance with the operating speed of the counter circuit 4, by changing the closed loop gain A of the oscillator 3. Further, since the same pulsed waveform is always output as long as the gain G is one or more, the varying range can be adjusted without causing any other inconvenience.

In the oscillator 3 of the detection apparatus 1, the capacitor 36 having one end connected to the ground terminal 39 is constituted by the sensor 8. Therefore, when a plurality of sensors 8 are used together with the circuits 11 to form the respective oscillators 3 as illustrated in FIG. 11, one end of each sensor 8 can be connected to a common line. If a plurality of sensors 8 are formed on a silicon chip, which is similar to that of the resonator array 20, the sensors each having one end previously connected to each other can be readily formed. Therefore, if such sensors 8 are used to form a plurality of oscillators 3, the mutually connected ends of the sensors can be connected to the ground line 39 at one point. This eliminates a laborious operation for respectively connecting one end of the sensors 8 to the ground line 39, thereby making it possible to significantly simplify the configuration of the detection apparatus 1.

If the detection apparatus 1 only has a single oscillator 3 with a sensor 8, another electric element such as the resistor 31 or capacitor 35 in FIG. 4 may be constituted as a sensor element 8 for dictating the oscillation frequency f. Further alternatively, all of these electric elements may be constituted as sensor elements 8.

In the foregoing embodiments, the sensor 8 is formed as the capacitor 36, the capacitance C2 of which changes due to a change in a sensed physical amount. However, the sensor 8 is not limited to the one as mentioned. Alternatively, it is possible to utilize a sensor 8 having a resistance which changes due to a change in a sensed physical amount, for example. Also, while the resonator array 20 (FIGS. 7 and 9) as a plurality of sensors 8 changes its electrical characteristics by sensed mechanical vibrations, it is possible to use a variety of sensors 8 which change the electrical characteristics due to a changing humidity, temperature, magnetism, pressure, light, gas, and any other physical amount, in addition to the foregoing.

Figure 12:
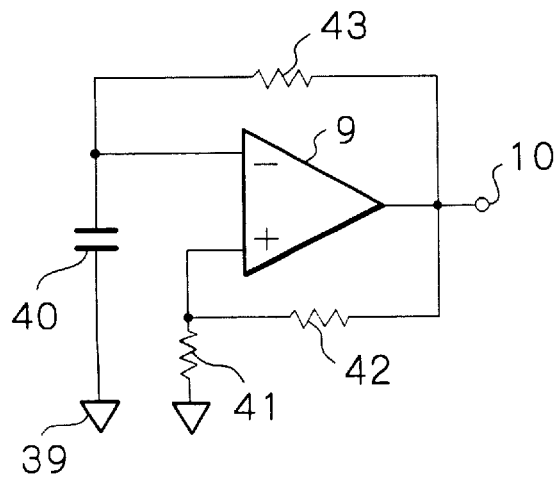
FIGS. 12 and 13 illustrate circuit diagrams of oscillators usable as the oscillation signal generation unit of the apparatus shown in FIG. 3.
Figure 13:
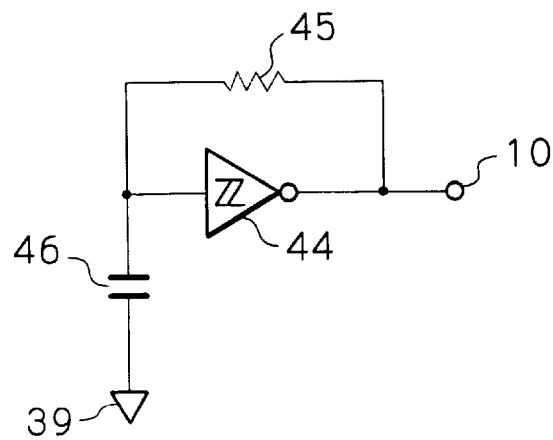

Furthermore, the oscillator 3 is not limited to a Wien bridge one, and another type of oscillator may be used instead. For example, a square wave oscillator using an operational amplifier as illustrated in FIG. 12 may be employed. In this case, at least any one of a capacitor 40, and resistors 41, 42, 43 may be constituted as the sensor 8, with the result that a change in a physical amount sensed by the sensor 8 can be output as a change in basic frequency of a square wave oscillating signal. Alternatively, a square wave oscillator using a CMOS Schmidt 44 as illustrated in FIG. 13 may be used. In this case, when at least one of a capacitor 46 and a resistor 45 is constituted as a sensor 8, a change in physical amount sensed by the sensor 8 can be output as a change in the basic frequency in the square wave oscillating signal. When an element having one end connected to a ground line 39, for example, the capacitor 40 or the capacitor 46 in FIG. 12 or 13, is constituted as a sensor 8 and the detection apparatus 1 is constituted to include a plurality of oscillation units 3 including a plurality of sensors 8 arranged in parallel, the apparatus can be significantly simplified because one ends of the sensors 8 can be previously connected together to a ground line at one point on a silicon chip, as is the case of the resonator array 20. In stead of connecting one end of sensor elements to the ground line, it is also possible to connect them to another reference voltage line such as a positive or negative power supply line, by which the apparatus can be simplified.

Other different oscillators may be used in the detection apparatus 1. When an LC oscillation unit is utilized, it is possible to employ such a sensor that changes its inductance due to a change in a detected physical amount. Further, even an oscillation unit which provides a pulsed signal having an amplitude smaller than a supply voltage, or a signal having a sinusoidal waveform may be utilized if the amplitude are larger than a threshold level.

A tested example of the detection apparatus 1 has been configured using oscillators 3 each illustrated in FIG. 4 and a resonator array as sensors 8 illustrated in FIG. 7. The respective constants of elements of each oscillation unit 3 were as follows: R1=R2=R3=50 kΩ, R4=500 kΩ, and C1=100 fF. Therefore, the closed loop gain A was calculated to be 11. A cycle (reference time period) during which the counters 4 counts the number of waves was chosen to be 6.7 μS.

In the tested apparatus, a 5 KHz sinusoidal wave was applied to the first diaphragm 21 of the resonator array 20, as a detection signal. In this event, the number of waves were counted at 30 points per cycle of the 5 KHz sinusoidal wave, in which case a maximum count value CNTmax was 134, and a minimum count value CNTmin was 78. From these count values CNTmax and CNTmin, a maximum frequency fmax=20.0 MHz and a minimum frequency fmin=11.6 MHz were derived. It was further obtained from them that the capacitance C2 of the capacitor 36 varies from a minimum capacitance Cmin equal to 10 fF (Cmin=10 fF) to a maximum capacitance Cmax equal to 500 fF (Cmax= 500 fF). Then, the amplitudes W of the lateral beams 24 formed in the resonator array 20 can be revealed on the basis of these capacitances Cmin and Cmax, as described above. With the closed loop gain A chosen to be 11, a varying range of the oscillation frequency f extended from 11.6 MHz to 20.0 MHz, which presents a frequency region sufficiently countable by a general-purpose high speed CMOS-IC counter or the like. Moreover, since one count, if averaged, of the wave corresponds to a change in capacitance equal to approximately 9 fF, detection can be achieved with a sufficient resolution. In addition, since the number of waves can be counted by a counter having an 8-bit binary output, the configuration of the counter 4 can also be simplified.

Figure 14:
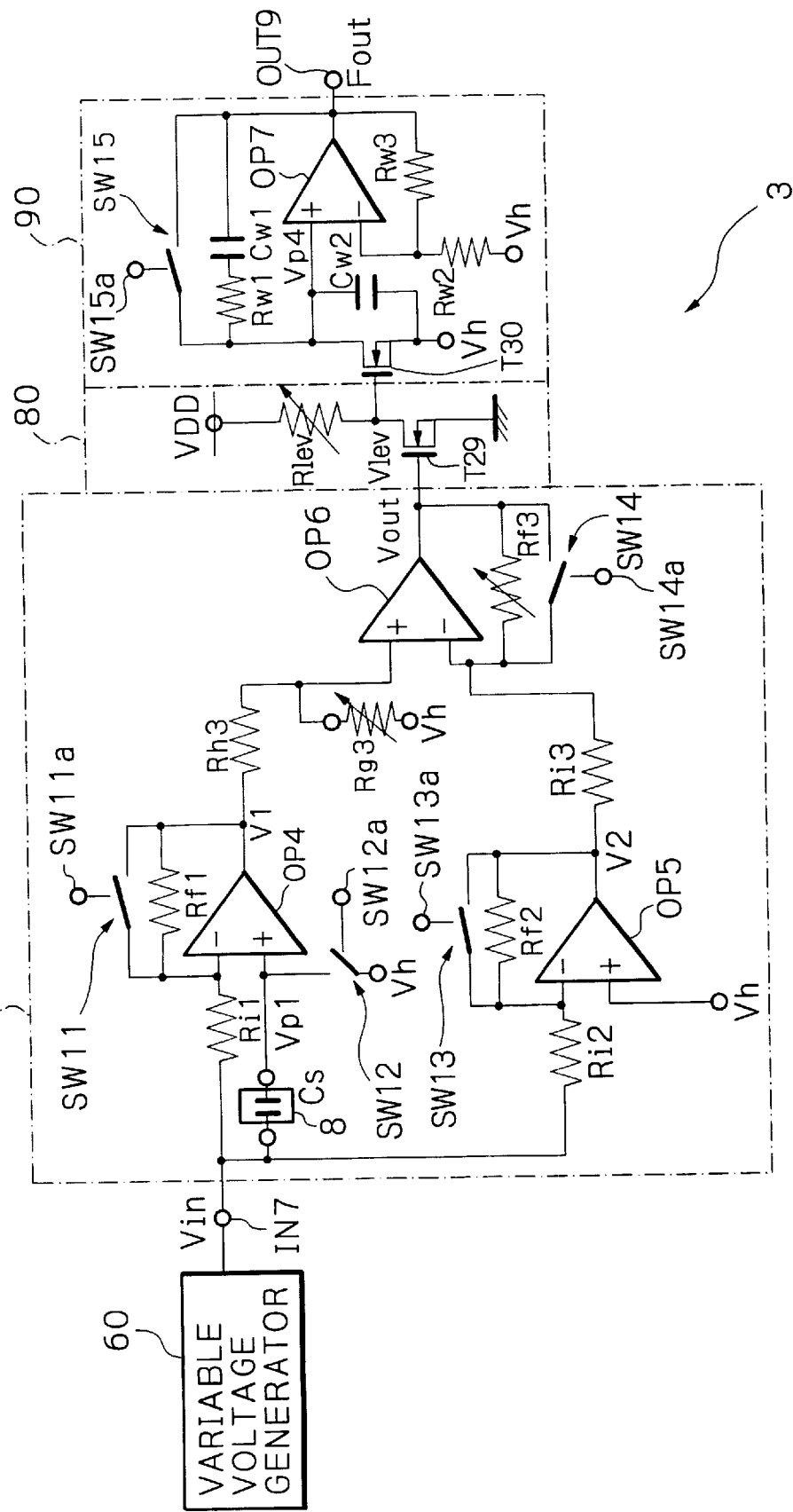
FIG. 14 is a block diagram illustrating another constitution of the oscillation signal generation unit of the apparatus shown in FIG. 3.

FIG. 14 is a block diagram illustrating of another embodiment of an oscillation signal generation unit 3 of the detection apparatus 1 shown in FIG. 3 according to the present invention, which comprises a variable voltage generator 60, a voltage output circuit 70, a voltage adding circuit 80, an oscillator 90, and a control unit (not shown). The oscillator 90 provides an oscillation output signal Fout from an output terminal OUT9 to the counter 4 illustrated in FIG. 4, and in turn the counter 4 counts the number of waves (or wave number) of the signal Fout in a predetermined time period. The control unit controls the variable voltage generator 60, the voltage output circuit 70 and the oscillator 90. The variable voltage generator 60 generates a voltage Vh or Vh+ΔV as an input voltage Vin to an input terminal IN7 of the voltage output circuit 70. The control unit controls switches in the voltage output circuit 70 and the oscillator 90 to turn on/off. The control unit may control a reset or clear operation of the counter 4 (FIG. 3).

The voltage output circuit 70 includes first through third operational amplifiers OP4–OP6. A resistor Ri1 is connected between a voltage input terminal or node (Vin) and an inverting input terminal or node of the first operational amplifier OP4, while a feedback circuit including a resistor Rf1 and a switch SW11 connected in parallel to each other is connected between an output terminal or node and the inverting input terminal of the first operational amplifier OP4. A sensor 8, which varies its capacitance Cs due to a change in a sensed physical amount (for example, pressure, vibrations, temperature, gas density or the like), is connected between a non-inverting input terminal or node of the operational amplifier OP4 and the voltage input terminal IN7. The non-inverting input terminal is connected through a switch SW12 to a reference voltage terminal Vh, (which provides the reference voltage Vh). Thus, these components mentioned above constitute a capacitance/voltage converter circuit for converting the capacitance Cs of the sensor 8 to an output voltage V1.

A resistor Ri2 is connected between an inverting input terminal or node of the second operational amplifier OP5 and the voltage input terminal IN7, while a feedback circuit including a resistor Rf2 and a switch SW13 connected in parallel with each other is connected between an output terminal or node and the inverting input terminal of the second operational amplifier OP5. A non-inverting input terminal or node of the operational amplifier OP5 is connected to the reference voltage terminal Vh.

The output terminal of the first operational amplifier OP4 is connected to a reference voltage terminal Vh through voltage dividing resistors Rh3 and Rg3 connected in series to each other, and a connection point thereof is connected to a non-inverting input terminal or node of the third operational amplifier OP6. The resistor Rh3 has a fixed resistance, while the resistor Rg3 is formed as a volume and thus has a variable resistance. The output terminal of the second operational amplifier OP5 is connected to an inverting input terminal or node of the third operational amplifier OP6 through a resistor Ri3. A feedback circuit which includes a variable resistor Rf3 and a switch SW14 connected in parallel with each other is connected between an output terminal or node and the inverting input terminal of the operational amplifier OP6.

The voltage adding circuit 80 comprises an N-channel enhancement-type MOS transistor T29, for example. The transistor T 29 has a gate connected to an output terminal or node of the voltage output circuit 70, i.e., the output terminal of the operational amplifier OP6 is connected to the gate of the transistor T29. A source of the transistor T29 is connected to a ground. A drain of the transistor T29 is connected to a positive power supply terminal VDD providing a voltage +VDD through a load variable resistor Rlev, and hence serves as an output terminal or node of the voltage adding circuit 80.

The oscillator 90 is basically formed as a Wien bridge one. Namely, a resistor Rw1 and a capacitor Cw1 connected in series with each other are connected between a non-inverting input terminal or node and an output terminal or node of a forth operational amplifier OP7. A switch SW15 is connected in parallel with the Rw1-Cw1 series circuit. A capacitor Cw2 and a MOS transistor T30, a drain and source of which are connected in parallel with the capacitor Cw2, are coupled between the non-inverting input terminal of the operational amplifier OP7 and a reference voltage terminal Vh. The resistor Rw1, capacitors Cw1 and Cw2, and a resistance of the drain-source of the transistor T30 constitute a CR feedback circuit network of the Wien bridge oscillator. The transistor T30 is the same type (i.e., an N-channel enhancement-type) as that the transistor T29. The transistor T30 has a gate connected to the output terminal of the voltage adding circuit 80, i.e., the drain of the transistor T29. Further, a resistor Rw2 is connected between an inverting input terminal or node of the operational amplifier OP7 and a reference voltage terminal Vh, and a resistor Rw3 is connected between the inverting input terminal and the output terminal of the amplifier OP7. The output terminal of the operational amplifier OP7 is connected to an output terminal or node of the oscillator 90.

The output signal Fout from the oscillator 90 is provided to the counter 4 (FIG. 3) where the waves of the signal Fout are counted for the predetermined time period. As mentioned above with reference to FIG. 3, the counter 4 may be a normal binary counter with a clear terminal which receives the signal Fout from the output terminal OUT9 as an input clock signal, counts the number of the waves of the signal until a clear signal is provided to the clear terminal from the control unit every the predetermined time period, and then outputs the count value obtained immediately before the clear timing, for example. Thus, the counter 4 can output a binary digital signal corresponding to the frequency of the signal Fout.

All the reference terminals Vh are connected to the same voltage lines to provide the same voltage Vh.

The control unit may be implemented, for example, by a microcomputer and a driving circuit. The control unit may provide the same control signal CTRL to switching control terminals SW11a, SW12a, SW13a, SW14a, Sw15a of the respective switches SW11, SW12, SW13, SW14, SW15 so that they turn on or off at the same timing. The control unit also controls the voltage generator 60 to generate the voltage Vh or Vh+ΔV as the input voltage Vin to the input terminal IN7.

Figure 15:
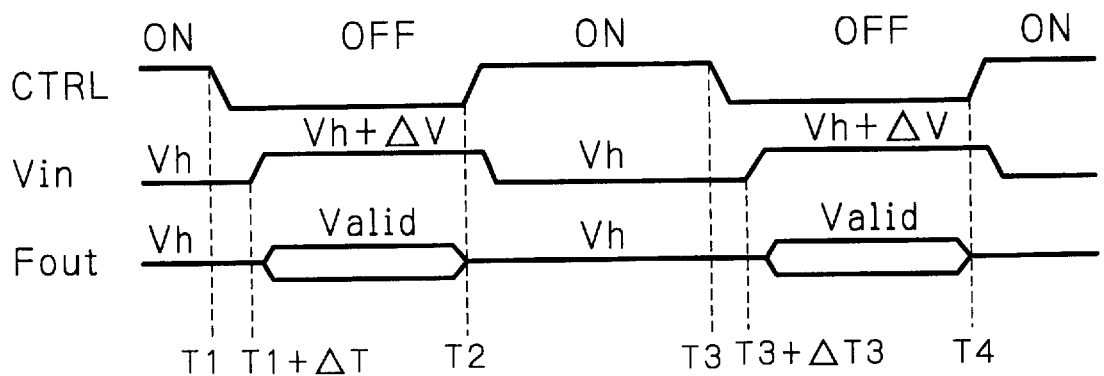
FIG. 15 shows time charts for explaining an operation of the oscillation signal generation unit in FIG. 14.

Next, it will be explained an operation of the oscillation unit 3 illustrated in FIG. 14. FIG. 15 is timing charts illustrating states of the control signal CTRL applied by the control unit to all the switching control terminals SW11a–SW15a of the respective switches SW11–SW15, the voltage Vin input to the voltage input terminal IN7, and the signal Fout output from the output terminal OUT9. Up to a time T1, the control unit provides the control signal CTRL at high level to maintain all the switches SW11–SW15 turned on. While these switches are the ON states, the control unit controls the variable voltage generator 60 to provide the voltage Vin=Vh to the voltage input terminal IN7. Further, because of the ON states of the switches, the outputs of the operational amplifiers OP4–OP7 are at the reference voltage Vh and hence the output signal Fout from the output terminal OUT9 is kept at Vh. Therefore, the oscillation unit 3 has been initialized. In this event, it is also possible that the voltage input terminal IN7 may be applied with the reference voltage Vh by the control unit itself, provided that a high impedance condition is created between the voltage input terminal IN7 and the control unit.

Next, at a time T1, the control unit changes the control signal CTRL to a low level, resulting in turning off the respective switches SW11–SW15. The output voltage V1 of the first operational amplifier OP4 during the OFF states of the switches SW11–SW15 is expressed by the following equation where Vp1 is a voltage at the non-inverting input terminal of the amplifier OP4:

$$V1 = -(Rf1/Ri1)(Vin - Vp1) + Vp1 \tag{4}$$

When Rf1 and Ri1 are the same or Rf1/Ri1=1, the above equation (4) is changed to:

$$V1 = -Vin + 2Vp1 \tag{5}$$

The output voltage V2 of the second operational amplifier OP5 is expressed by the following equation, provided that Rf2/Ri2=1:

$$V2 = -(Rf2/Ri2)(Vin - Vh) + Vh \tag{6}$$
$$= -Vin + 2Vh$$

The output voltage value Vout of the third operational amplifier OP6 is expressed by the following equation:

$$Vout = K(V1 - V2) + Vh \tag{7}$$

(where, K=Rg3/Rh3=Rf3/Ri3)

Next, at the time T1+ΔT, the voltage Vin from the variable voltage generator 60 to the voltage input terminal IN7 is changed from the reference voltage Vh to a higher predetermined voltage Vh+ΔV. Since voltages in this circuit is treated as a difference from the reference voltage Vh, Vh=0 is assumed in the following description. With Vh=0, the voltage Vp1 at the non-inverting input terminal of the first operational amplifier OP4 is expressed by:

$$Vp1 = \Delta V^* Cs/(Cs + Cp) \tag{8}$$

Here, Cp is a parasitic capacitance formed at a connection between the sensor 8 and the operational amplifier OP4. Then, substituting the equation (8) into the aforementioned equations (4) and (5) in which Vh=0, respectively, the following equations are derived:

$$V1 = -Vin + 2\Delta V^* Cs/(Cs + Cp)$$
$$V2 = -Vin$$

The output voltage Vout of the voltage output circuit 70 can be derived as follows by substituting these equations into the equation (6):

$$\text{Vout} = 2K^* \Delta V^* Cs/(Cs+Cp) \qquad (9)$$

When the sensor 8 and the first operational amplifier OP4 are formed on respective separate chips, the parasitic capacitance Cp formed at a connecting portion of the two generally lies in a range of one pF to about one hundred pF or more. On the other hand, since the capacitance Cs of the sensor 8 is generally in a range from about one fF to several hundreds fF, and thus Cp>>Cs stands, Cs/(Cs+Cp) in the equation (9) can be approximated to Cs/Cp. Therefore, the output voltage Vout of the voltage output circuit 70 can be expressed by:

$$\text{Vout} = 2K^* \Delta V^* Cs/Cp \qquad (10)$$

As is apparent from the equation (10), the voltage output circuit 70 generates the output voltage Vout proportional to the capacitance Cs of the sensor 8. The equation (10) indicates that a voltage proportional to the sensor capacitance Cs can be derived from the third operational amplifier OP6. It should be noted that the equation (10) becomes more complex, when Vh is not zero. Since the principle of the operation in the case of Vh≠0 is the same as that in the case of Vh=0, an equation representing the Vout in the case of Vh≠0 has been omitted.

Figure 16:
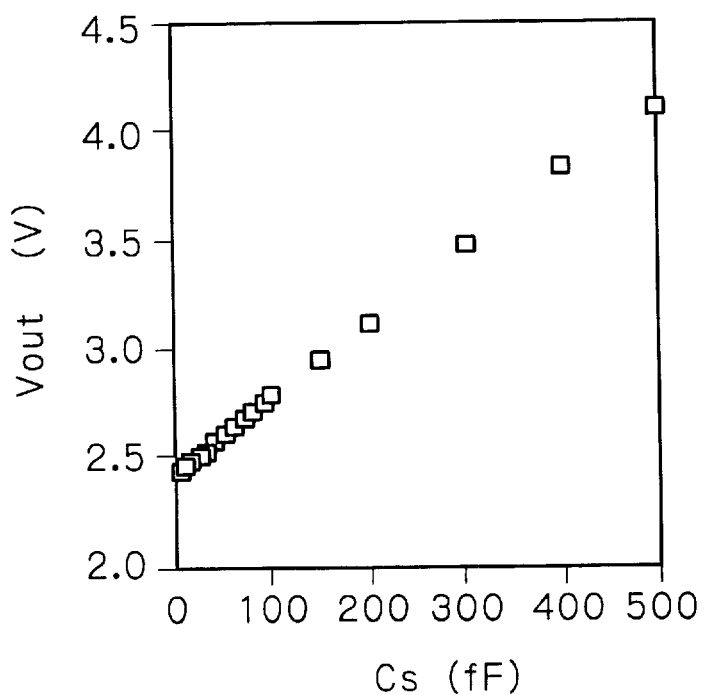
FIG. 16 is a graph illustrating a relationship between a sensor capacitance and an output voltage of a simulated example of the voltage output circuit shown in FIG. 14.
Figure 17:
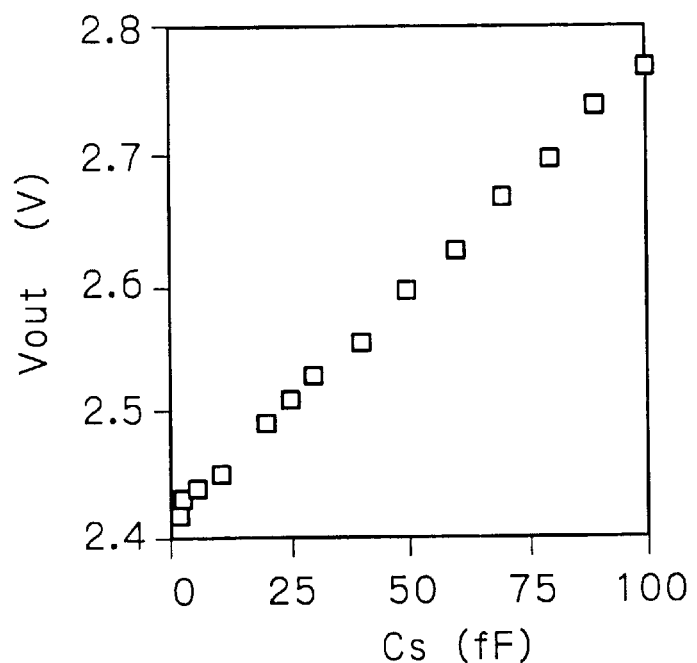
FIG. 17 is an enlarged graph of that shown in FIG. 16.

FIG. 16 is a graph illustrating a relationship between a capacitance Cs of a sensor 8 and an output voltage Vout of a simulated example of the voltage output circuit 70. FIG. 17 is a graph illustrating in an enlarged view only a part of the graph in FIG. 16, where the capacitance Cs of the sensor 8 is 100 fF or less. In the simulated circuit, it was assumed that resistors of Ri1=Rf1=Ri2=Rf2=Rh3=Ri3=10 kΩ and variable resisters of Rg3=Rf3=1MΩ were utilized, and that the Rg3 and Rf3 were adjusted to satisfy Rg3/Rh3=Rf3/Ri3. As is also apparent from these graphs shown in FIGS. 16 and 17, it is understood that the capacitance Cs of the sensor 8 and the output voltage Vout are substantially in a proportional relationship, as indicted by the equation (10). This proportional relationship is held even when the capacitance Cs of the sensor 8 is very small equal to or less than 100 fF. In FIGS. 16 and 17, the parasitic capacitance is assumed to be 20 pF, and Vh=Vdd/2=2.5V. Therefore, if Cs is zero, Vout is about 2.5V.

The output voltage of the voltage output circuit 70 is next input to the gate of the transistor T29 of the voltage adding circuit 80. A gate-to-drain voltage of the transistor T29 is determined by a drain-source current flowing under the control of the gate voltage Vout and the resistance Rlev. This gate-to-drain voltage, which is a direct current voltage, is added to the voltage Vout and then output as an output voltage Vlev to the oscillator 90. A theoretical value of the voltage Vlev can be expressed by the following equation:

$$\text{Vlev} = VDD - (1/2)R\text{lev}^* \beta 1 (\text{Vout} - Vt)^2 \qquad (11)$$

In the equation (7), β1 and Vt are a gain coefficient and threshold voltage of the transistor T29. As indicated in the above equation (11), the voltage Vlev theoretically changes in proportion to a square of the difference between Vout and Vt.

The output voltage Vlev is then provided to the gate of the transistor T30. A theoretical ON-resistance Ron of the transistor T30 is expressed by the following equation using the voltage Vlev:

$$R\text{on} = Vp4/[\beta 2\{(V\text{lev} - Vt)Vp4 - (1/2)Vp4^2\}] \qquad (12)$$

In the equation (12), Vp4 is a voltage at the non-inverting input terminal of the operational amplifier OP7. As will be understood from the equation (12), the resistance Ron theoretically changes in proportion to an inverse of the difference between Vlev and Vt. This resistance Ron functions as a resistive element in a CR feedback circuit network in the Wien bridge oscillator 90. Therefore, the frequency f of the signal Fout output from the output terminal OUT9 is expressed by the following equation:

$$f = 1/(2\pi)^* (Rw1^* Ron^* Cw1^* Cw2)^{-1/2} \qquad (13)$$

In other words, the frequency f changes in proportion to an inverse of a square root of the resistance Ron. The signal Fout at the frequency f expressed in the equation (13) is output while all the switches SW11–SW15 are off by the control signal CTRL. Subsequently, when the respective switches SW11–SW15 are again turned on at a time T2 as shown in FIG. 16, charge accumulated on a parasitic capacitance between the sensor 8 and the operational amplifier OP4 is discharged again, and the reference voltage Vh is again output from the output terminal OUT9. Then, the respective switches SW11–SW15 are again turned off at a time T3, the voltage Vin at the voltage input terminal IN7 is increased to the measured voltage value Vh+ΔV, resulting in that the output signal Fout at the frequency f outputs from the output terminal OUT9, in a manner similar to the foregoing.

Figure 18:
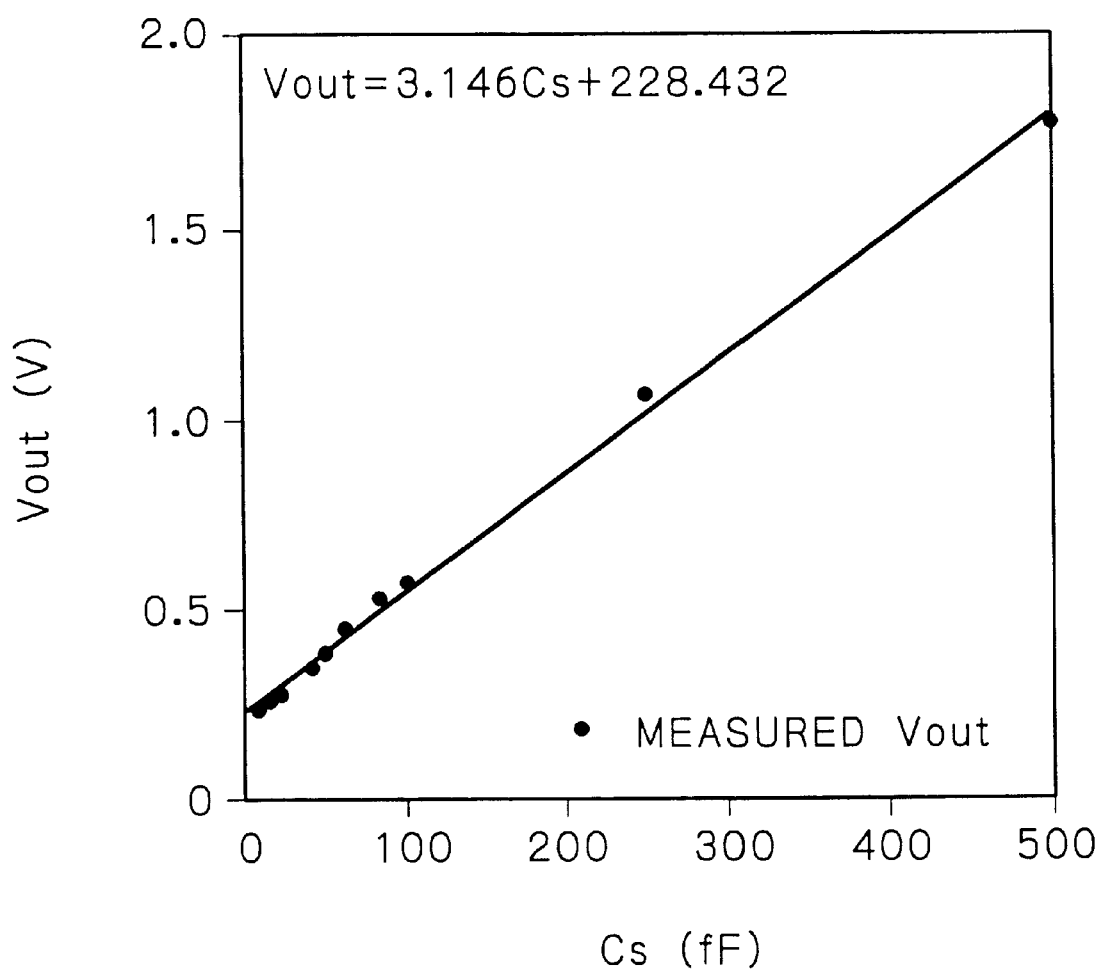
FIG. 18 is a graph illustrating a relationship between a sensor capacitance and an output voltage obtained in a tested example of the voltage output circuit shown in FIG. 14.

FIG. 18 is a graph showing the relationship between a capacitance Cs of a sensor and an output voltage Vout of a tested example of the voltage output circuit 70, in which the capacitance Cs was changed variously and the voltage Vout was measured for each capacitance Cs. In the graph, dotted points represent the measured voltages. As is apparent from the graph, the voltage Vout linearly varied in response to the capacitance Cs in the tested example, the relationship of which could express as follows:

$$\text{Vout} = 3.146 Cs + 228.432$$

In the tested example, the minimum value of measured capacitances Cs was 5 fF.

Accordingly, the output voltage linearly variable in response to the sensor capacitance may be obtained, according to the present invention.

Figure 19:
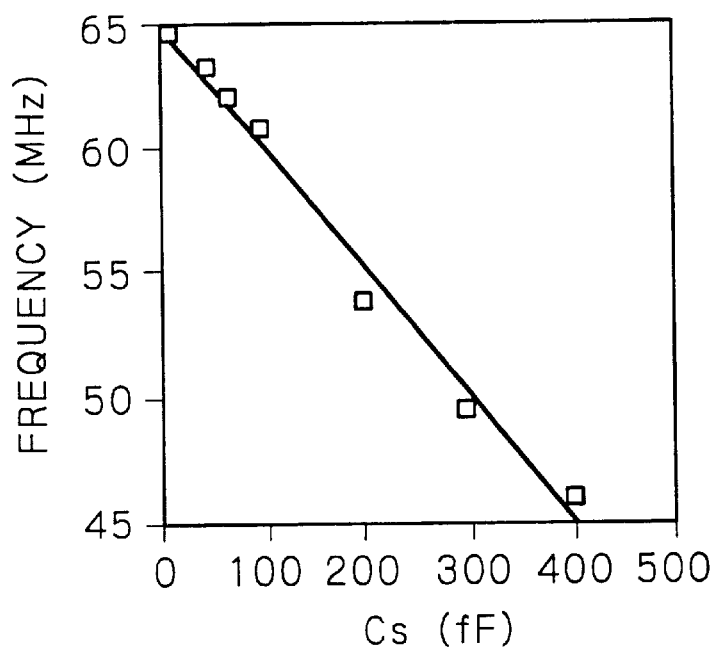
FIG. 19 is a graph illustrating a relationship between a sensor capacitance and an oscillation frequency in a simulated example of the oscillation signal generation unit shown in FIG. 14.

FIG. 19 is a graph illustrating the relationship between a capacitance Cs of a sensor 8 and a frequency f of an output signal Fout in a range of the capacitance Cs below 400 fF, in a tested apparatus having a constitution as shown in FIG. 14. In the tested apparatus, a voltage output circuit 70 had the same constitution as the tested one explained with regard to FIGS. 16 and 17. A load resistor Rlev was implemented by a 1 kΩ variable resistor and adjusted such that an ON-resistance Ron of a transistor T30 was suitable for causing a Wien bridge oscillator 90 to oscillate. Respective constants associated with the Wien bridge oscillator 90 were: Rw1=50 kΩ, Cw1=Cw2=100 fF, Rw2=1MΩ and Rw3=2MΩ. As illustrated in FIG. 18, it is understood that the capacitance Cs and the frequency f are substantially in a proportional relationship in the region mentioned above. While a detailed analysis will be expected, it is considered that non-linearity produced when the gate-to-drain voltage of the transistor T29 is added to the voltage Vout, and non-linearity produced when the ON-resistance Ron of the transistor T30 is changed by the voltage Vlev are main causes to cancel non-linearity in a change in the oscillation frequency f with respect to the resistance Ron.

As is apparent from FIG. 19, the frequency f from the oscillator 90 linearly varied in response to the sensor capacitance Cs, and thus complicated operations can be eliminated in the processing unit 2.

According to the oscillation signal generation unit 3 with the sensor 8 shown in FIG. 14, the capacitance Cs of the sensor 8 is once converted into the voltage Vout, instead of directly changing the oscillation frequency f in response to the capacitance Cs. Then, the ON-resistance Ron of the transistor T30 is controlled with the voltage Vlev based on the voltage Vout, and the oscillation frequency f of the Wien bridge oscillator 90 is changed depending on the ON-resistance Ron. Accordingly, the oscillation condition and the oscillation frequency f of the oscillator 90 is free from the influence of the relationship between a parasitic capacitance formed at the input terminal of the operational amplifier OP7 and the capacitance Cs of the sensor 8. It is, therefore, possible to always stably oscillate the oscillator 90, and derive an appropriate oscillation frequency f which properly varies on the basis of a variation of the capacitance Cs. In this way, the capacitance Cs of the sensor 8 can be reliably counted by the counter 4 (FIG. 3). Moreover, since the ON-resistance of the transistor T30 functions as a variable resistive element, the circuit configuration is simple and less expensive, and also suitable for implementation of the oscillator 90 in a on-chip configuration.

Further, since the voltage Vlev output from the voltage adding circuit 80 can be adjusted, a suitable ON-resistance Ron of the transistor T30 can be provided to cause the oscillator 90 to properly oscillate without fail. Consequently, the oscillator 90 can be operated in a stable state.

The frequency f of the signal Fout output from the oscillator 90 changes in proportion to a change in the sensor capacitance Cs in a predetermined region as illustrated in FIG. 18. Therefore, complicated square operations, inverse operations and so on are not necessary to reveal in the capacitance Cs from the signal Fout. For this reason, even if a general-purpose microcomputer is used to obtain the capacitance value, a majority of its capabilities will not be used up for such complicated operations, so that the capacitance Cs can be readily revealed in real time. Thus, a simple configuration is realized for a system using the detection apparatus according to the present invention.

The voltage Vin at the voltage input terminal IN7 is increased from Vh to Vh+ΔV after the switch SW12 is turned off to separate the sensor 8 from the reference voltage terminal Vh. The voltage ΔV is chosen to be more than a predetermined level which is sufficient for injecting an enough amount of charge into the sensor 8. Therefore, even if a large parasitic capacitance is formed between the non-inverting input terminal of the operational amplifier OP4 and the sensor 8, a sufficient change in the voltage Vout can be provided with respect to a change in the capacitance Cs. Therefore, even if a large parasitic capacitance is present due to separate formation of the sensor 8 and the operational amplifier OP4 on different chips, the sensor capacitance Cs can be reliably converted into the voltage Vout.

In addition, the switch SW11 is turned on at the same timing as the switch SW12 during the initialization, and the voltage Vh is provided to the voltage input terminal IN7. This causes both ends of the sensor 8 to be at an equal potential, so that all the charge so far accumulated on the sensor 8 can be discharged therefrom during the initialization. It is therefore possible to output more stable and accurate voltage Vout, as compared with simply charging the sensor 8. Further, when the switches SW11 and SW12 are turned on, the switches SW13–SW15 are also turned on. Therefore, the charge previously accumulated on stray and/or parasitic capacitances between the inverting input terminals and out put terminals of the operational amplifiers OP5 and OP6 in the voltage output circuit 70 and the capacitor Cw1 in the oscillator 90 can be likewise discharged without fail before starting a measurement. As to the capacitor Cw2, since its terminals are the same voltage Vh by means of the turned-on switch SW15, any charge can be discharged during the initialization. It is therefore possible to output a more stable and accurate detection signal.

In the voltage output circuit 70, the operational amplifier OP6 functioning as a differential amplifier is used to amplify the difference between the voltages V1 and V2 Vin from the operational amplifiers OP4 and OP5. Since the voltages V1 and V2 rely on the input voltage Vin, the influence of the voltage Vin can not appear on the output voltage Vout by the differential amplification. This can prevent the output voltage Vout from becoming saturated even if a large change in the applied voltage Vin is provided, whereby the gain of the operational amplifier OP6 can be made appropriate in accordance with the ratio of the capacitance Cs of the sensor 8 to the parasitic capacitance Cp.

From the counter 4, a value corresponding to a physical amount or capacitance sensed at the sensor 8 is output as a digital signal. Consequently, an A/D converter for converting an analog signal corresponding to a sensor capacitance Cs to a digital signal is eliminated, thereby making it possible to improve noise immunity and configure the detection apparatus of low power consumption.

In the apparatus shown in FIG. 14, within the CR feedback circuit network of the Wien bridge oscillator 90, the resistive element connected between the non-inverting input terminal of the operational amplifier OP7 and the reference voltage terminal Vh is implemented by the MOS transistor T30. However, instead of the constitution shown in FIG. 15, it is possible to replace the transistor T30 and the resistor Rw1 of the feedback loop of the operational amplifier OP7.

Further, in the apparatus, the second and third operational amplifiers OP5 and OP6 are employed to substrate the influence of the voltage Vin applied to the voltage input terminal IN7 from the output V1 of the first operational amplifier OP4. A gain of the amplifier OP6 can be appropriately set by the variable resistors Rg3 and Rf3. However, if simplification and reduced costs are a higher priority for the apparatus than such an appropriate setting of the amplification gain, the operational amplifiers OP5 and OP6 may be removed from the apparatus, and the voltage V1 may be directly provided to the gate of the transistor T29, in which case a gain control may be executed by employing variable resistors as the resistors Ri1 and Rf1 around the operational amplifier OP4.

More further, as the voltage output circuit 70, a known voltage output circuit, such as described in Japanese Patent Public Disclosure (Kokai) No. 6-180336, may be utilized other than that illustrated in FIG. 15. This known circuit comprises an operational amplifier, a sensor, a switch, and resistors respectively corresponding to the elements OP4, 8, SW12, and Ri1 and Rf1. However, in the known circuit, since charge accumulated on the sensor is distributed also to a parasitic capacitance, the parasitic capacitance exerts a large influence to an output of the circuit. For this reason, the circuit described in No. 6-180336 can only be utilized when the sensor and operational amplifier are formed on a single silicon chip.

The oscillator 90 is not limited to an Wien bridge oscillator, and a square wave oscillator using an operational amplifier as shown in FIG. 12 or a CMOS Schmidt circuit as shown in FIG. 13 may be used instead of the Wien bridge one. Likewise, with such an alternative oscillator, a MOS FET can be functioned as a variable or controllable resistive element for changing an oscillation frequency, thereby making it possible to stably operate the oscillator and to derive an appropriate changing amount of the oscillation frequency f, irrespective of the relationship between a parasitic capacitance Cp and a sensor capacitance Cs.

In the apparatus shown in FIG. 15, the voltage ΔV is chosen to be a positive value, and hence the measuring voltage Vh+ΔV to be higher than the reference voltage Vh. Alternatively, the voltage ΔV may be a negative value to cause the measuring voltage Vh+ΔV be lower than the reference voltage Vh. While the apparatus is configured as a single-power supply circuit, it goes without saying that the apparatus may be a double-power supply circuit that involves positive and negative power supplies.

While specific embodiments of the present invention have been described, the present invention is not limited to the foregoing embodiments, but may be modified in various ways within the scope of the claimed invention.

What is claimed is:

1. An apparatus for detecting a sensor impedance which varies in response to a sensed physical amount of at least one sensor, comprising:
    an impedance-frequency conversion unit for converting the sensor impedance to a square wave oscillation signal, and comprising a Wien bridge oscillator which includes an amplifier, the sensor impedance and positive and negative feedback circuits of the amplifier;
    a product of a gain of the amplifier and a positive feedback ratio of the positive feedback circuit being more than or equal to one.

2. The apparatus according to claim 1, wherein the positive feedback circuit includes a resistor and capacitor as the sensor impedance.

3. The apparatus according to claim 1, wherein the amplifier has a variable gain.

4. The apparatus according to claim 1, further comprising a counter for counting the number of waves of the oscillation signal in a predetermined time period; and
    wherein the sensor impedance has one end connected to a reference voltage.

5. The apparatus according to claim 1, further comprising additional sensors, wherein the impedance-frequency conversion unit further comprises additional oscillators including the additional sensor impedances.

6. The apparatus according to claim 5, further comprising a counter for counting the number of waves of the oscillation signal in a predetermined time period; and
    wherein the sensors are constituted as a resonator array and the oscillators generate square wave signals as oscillation signal.

7. An apparatus for detecting a sensor impedance which varies in response to a sensed physical amount of at least one sensor comprising:
    an impedance-frequency conversion unit for converting the sensor impedance to an oscillation signal, comprising:
        an impedance-voltage converter for providing an output voltage corresponding to the sensor impedance; and
        an oscillator for generating the oscillation signal including a variable impedance element, an impedance of which varies in response to the output voltage of the impedance-voltage converter, an amplifier and positive and negative feedback circuits of the amplifier,
        a product of a gain of the amplifier and a positive feedback ratio of the positive feedback circuit being more than or equal to one.

8. The apparatus according to claim 7, wherein a frequency of the oscillator depends on an impedance of the variable impedance element.

9. The apparatus according to claim 7, further comprising a voltage adding unit for adding a predetermined DC voltage to the output voltage of the impedance-voltage converter.

10. The apparatus according to claim 9, wherein the variable impedance element of the oscillator is formed by a drain-source resistance of a first MOS FET which is variable by a voltage applied to a gate thereof, and the voltage adding unit comprises a second MOS FET having a gate connected to receive the output voltage corresponding to the sensor impedance, and a drain connected to a variable load resistor and providing the added voltage to the gate of the first MOS FET.

11. The apparatus according to claim 10, the impedance-voltage converter further comprises:
    a first operational amplifier having an inverting input connected to receive an input voltage through a resistor and connected to its output through a resistor, and a non-inverting input connected to receive the input voltage through the sensor impedance and connected to a reference voltage terminal through a first switch, wherein the input voltage is variable when the switch is turned off;
    a second operational amplifier having an inverting input connected to receive the input voltage through a resistor and connected to its output through a resistor, and a non-inverting input connected to a reference voltage terminal; and
    a third operational amplifier having a non-inverting input connected to receive an output voltage from the first operational amplifier, an inverting input connected to receive an output voltage from the second operational amplifier and connected to its output through a variable resistor, the output being connected to the gate of the second MOS FET.

12. The apparatus according to claim 11, further comprising first through third switches which connect the outputs of the first through third operational amplifier with the inverting inputs thereof, respectively.

13. The apparatus according to claim 12, wherein the first through third switches are turned on during a reset cycle.

14. The apparatus according to claim 13, wherein the first through third switches are turned off before starting a measurement cycle.

15. The apparatus according to claim 7, further comprising a counter for counting the number of waves of the oscillation signal in a predetermined time period; and
    wherein the variable impedance element of the oscillator is a resistive one.

16. The apparatus according to claim 7, wherein the sensor impedance is a capacitor.

17. The apparatus according to claim 7, wherein the sensor impedance is a capacitor, and the impedance-voltage converter comprises:
    a first operational amplifier having an inverting input connected to receive an input voltage through a resistor and connected to its output through a resistor, and a non-inverting input connected to receive the input voltage through the sensor impedance and connected to a reference voltage terminal through a first switch, wherein the input voltage is variable when the switch is turned off.

18. A method of detecting a capacitance which varies in response to a sensed physical amount of a sensor, comprising the steps of:

converting the sensor capacitance to a voltage corresponding thereto;

varying a resistance of an element in response to the converted voltage;

generating a frequency signal from an oscillator, which varies in response to the resistance of the element; and counting the number of waves of the frequency signal from the oscillator in a predetermined time period, whereby the sensor capacitance is converted to the oscillation frequency signal which is a digital form.

19. The method according to claim 18, wherein the converting step comprises the steps of:

providing an input voltage to inverting and non-inverting inputs of a first operational amplifier through a resistor and the sensor, and an inverting input of a second operational amplifier through a resistor, a non-inverting input of the second operational amplifier being connected to a reference voltage terminal; and providing output voltages of the first and second operational amplifier to inverting and non-inverting inputs of a third operational amplifier to differentially amplifying the output voltages thereof, whereby the voltage proportional to the sensor capacitance is outputted from the third operational amplifier.

20. The method according to claim 19, wherein the first through third operational amplifiers include first through third negative feedback circuits comprising first through third resistors and first through third switches connected in parallel to each other, respectively, and the non-inverting input of the first operational amplifier is connected to the reference voltage terminal through a fourth switch, the method further comprising the steps of:

turning on the first through fourth switches during a reset cycle; and turning off the first through fourth switches before starting a measurement cycle.

21. An apparatus for detecting a sensor impedance, which varies in response to a sensed physical amount of at least one sensor comprising:

an impedance-frequency converter for providing an output voltage corresponding to the sensor impedance;

an oscillator including a variable impedance element which varies in response to the output voltage of the impedance-frequency converter; and a voltage adding unit connected between he impedance-frequency converter and the oscillator.

* * * * *